United States Patent [19]

Kotani et al.

[11] Patent Number: 5,003,330
[45] Date of Patent: Mar. 26, 1991

[54] ELECTRONIC FLASH AND LENS-FITTED PHOTOGRAPHIC FILM UNIT INCLUDING THE SAME

[75] Inventors: Takaaki Kotani; Tokuji Sato, both of Tokyo, Japan

[73] Assignee: Fuji Photo Film Co., Ltd., Kanagawa, Japan

[21] Appl. No.: 203,069

[22] Filed: Jun. 6, 1988

[30] Foreign Application Priority Data

Jun. 5, 1987 [JP] Japan .................. 62-87310
Aug. 12, 1987 [JP] Japan .................. 62-123722
Oct. 5, 1987 [JP] Japan .................. 62-152639

[51] Int. Cl.⁵ .......................... G03B 15/03
[52] U.S. Cl. .................. 354/145; 354/149.11; 354/288
[58] Field of Search .......... 354/145.1, 149.11, 288, 354/75, 76; 362/3, 8, 9

[56] References Cited

U.S. PATENT DOCUMENTS

| | | | |
|---|---|---|---|
| 3,731,586 | 5/1973 | Meazza | 354/76 |
| 4,001,640 | 1/1977 | Biber | 354/145.1 X |
| 4,077,042 | 2/1978 | Imura et al. | 354/145.1 X |
| 4,279,488 | 7/1981 | Hines | 354/145.1 |
| 4,406,533 | 9/1983 | Yamamoto | 354/288 X |
| 4,766,451 | 8/1988 | Fujimura et al. | 354/288 X |
| 4,801,957 | 1/1989 | Vandemoere | 354/145.1 X |

FOREIGN PATENT DOCUMENTS 1178858 1/1970 United Kingdom .
1505041 3/1978 United Kingdom .

Primary Examiner—Brian W. Brown
Attorney, Agent, or Firm—Young & Thompson

[57] ABSTRACT

An electronic flash comprises a housing provided with a light flash projecting window and incorporating a flash lamp assembly with its associated control circuit including a capacitor therein and an external casing enclosing the housing. The casing has at least an opening or part defined by and torn off along a perforated line to form an opening for exposing the light flash projecting window. The electonic flash with or without the external casing can be attached to a disposable lens-fitted film unit with a simple exposure member. The external casing is provided with an opening or part defined by and torn off along a perforated line to form an opening, or a flexible part defined by an incised line, for allowing a charge switch to be depressed from outside the external casing so as to charge the capacitor.

24 Claims, 7 Drawing Sheets

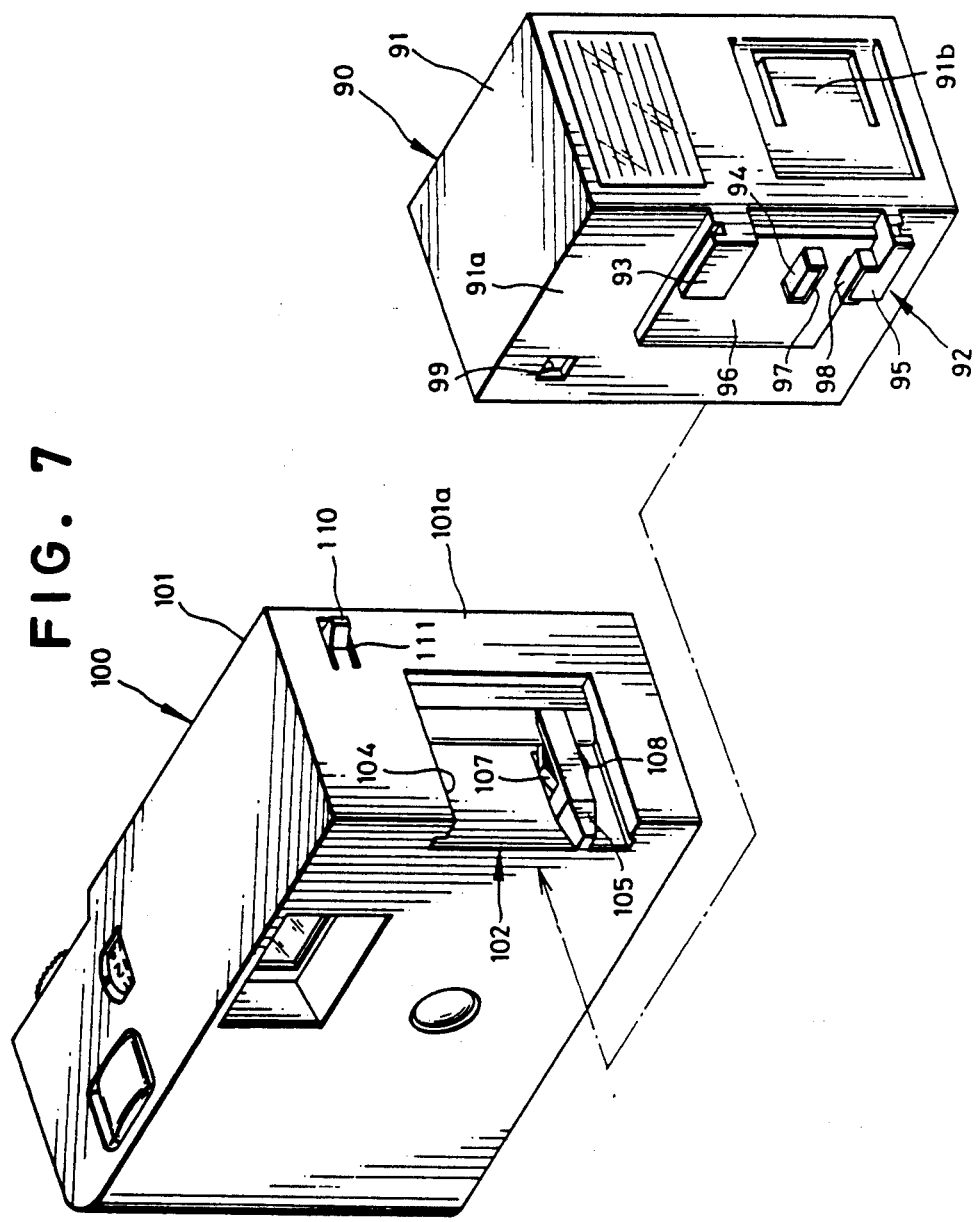

ELECTRONIC FLASH AND LENS-FITTED PHOTOGRAPHIC FILM UNIT INCLUDING THE SAME

FIELD OF THE INVENTION

The present invention relates to an electronic flash for a lens-fitted photographic device such as a camera or a lens-fitted photographic film unit, which is simple in construction and disposable.

BACKGROUND OF THE INVENTION

Recently, there have come on the market lens-fitted photographic film units which have a roll of film and a simple exposure mechanism incorporated in a casing as a unit. Because such a lens-fitted photographic film unit can be sold wherever photographic film is sold, if one takes no camera along but wants to take pictures, it is easy and inexpensive to buy a new lens-fitted photographic film unit and to take pictures without a camera.

For the purpose of lowering the cost, a simple shutter is used to give a single shutter speed such as 1/100 sec. On the other hand, the film used in such a lens-fitted photographic film unit has a relatively wide range of latitude of exposure. Although with such a single-speed shutter, it is relatively hard to cover a wide range of brightness of objects, recent photofinishing techniques nevertheless allow finishing prints with proper density.

However, it is often hard to finish prints of objects with too low brightness. In view of this, the present invention proposes to use an electronic flash with the lens-fitted photographic film unit to provide a wider range of exposure.

Almost all amateur cameras now on the market have so-called hot shoes comprising a standardized accessory shoe and an X-contact to which a hot shoe connection of an electronic flash can be attached. On the other hand, conventional electronic flashes, which are usable many thousands of times, are expensive. If in fact one takes no camera along but wants to take pictures, it is expensive to get a new flash at the place visited, even though it is possible to get a lens-fitted photographic film unit which is comparable in cost to conventional rolls of film. Even if the cost can be ignored, it is often hard to find a camera shop in the vicinity.

OBJECTS OF THE INVENTION

It is, therefore, an object of the present invention to provide an electronic flash which can be made at a low cost and is even cheap enough to be disposable.

It is another object of the present invention to provide an electronic flash of which a light flash projecting window is protected so as not to be dirtied and scratched.

It is still another object of the present invention to provide an electronic flash which has an electric contact that is protected from being dirtied with oil and the like.

It is a further object of the present invention to provide an electronic flash of which a charge switch is prevented from being inadvertently operated.

SUMMARY OF THE INVENTION

The above and other objects of the present invention can be accomplished by providing an electronic flash which comprises a roughly finished flash housing incorporating therein a flash lamp assembly and a flash control circuit such as a charge and discharge circuit, with their associated elements, and having at least a light flash projecting window, and an external casing entirely enclosing the housing therein which has openings or an openable part defined by and torn off along a perforated line to form an opening for exposing the flash light projecting window.

Preferably, the external casing of the electronic flash is made of a printable cardboard or a printable plastic sheet. By applying printing or an ornamental surface pattern to such an external casing, the flash housing can be only roughly finished on its outer surface. Therefore, the electronic flash can be provided at a low cost and is even disposable. This low-cost electronic flash is quite convenient when used along with a lens-fitted photographic film unit which is also disposable.

Because the light flash projecting window, which is generally made of a transparent plastic plat, is protected by the external casing before use, it is prevented from being dirtied and scratched. As a result, the light flash is sufficiently transmitted when the electronic flash is used.

According to another preferred embodiment of the present invention, the electronic flash is provided with a charge switch operable externally. For readily operating the charge switch, the external casing is provided with a part either defined by and torn off along a perforated line to expose the charge switch or defined by an incised line by which the part can be depressed. By providing such a part in the external casing, the charge switch is prevented from being inadvertently pushed before using the electronic flash.

According to a further preferred embodiment of the present invention, a hot shoe connection of the electronic flash by which is can be attached to a camera or a lens-fitted photographic film unit through a hot shoe is provided with an electric contact member for receiving a synchronizing signal from the camera or film unit. This electric contact member is disposed within a recess formed in the hot shoe connection so as to be prevented from being touched by the fingers. Therefore, this electric contact member will be prevented from being soiled by the fingers not only by means of the external casing when out of use but also by means of the recess when in use.

BRIEF DESCRIPTION OF THE DRAWINGS

These and other objects and features of the present invention will become apparent from the following description of preferred embodiments thereof with reference to the accompanying drawings in which like parts are designated by the same reference numerals throughout several views of the drawings and wherein:

FIG. 7 is an exploded perspective view similar to FIG. 1 showing an electronic flash according to another preferred embodiment of the present invention which is preferably used in with a lens-fitted photographic film unit the left of the electronic flash;

DETAILED DESCRIPTION OF THE INVENTION

Figure 1:
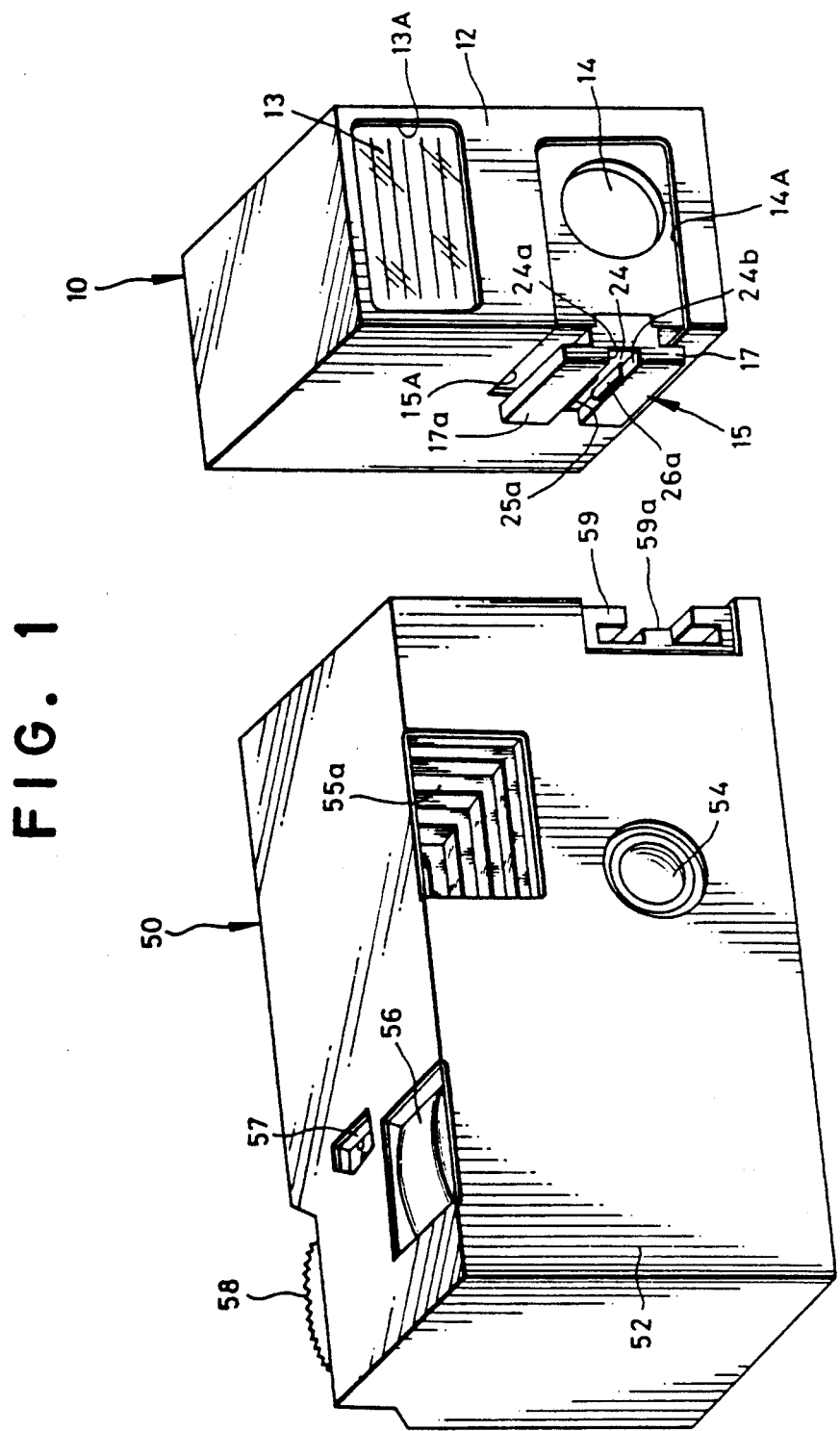
FIG. 1 is exploded perspective view of an electronic flash of a preferred embodiment of the present invention which is preferably used in cooperation with a lens-fitted photographic film unit illustrated to the left of the electronic flash.
Figure 2:
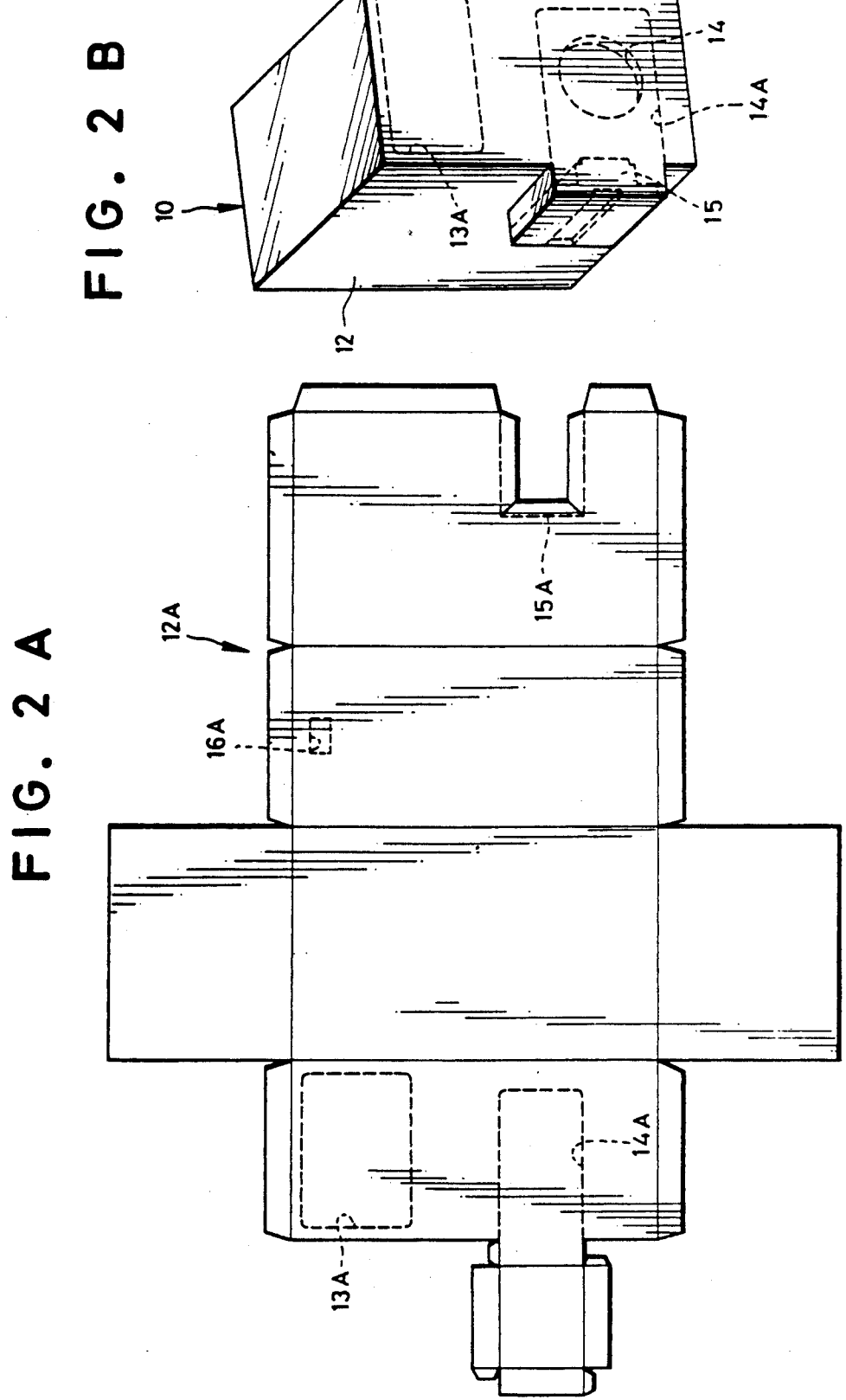
FIG. 2A is a top plan view showing a blank for making an external casing of the electronic flash of FIG. 1.
FIG. 2B is a perspective view of the electronic flash of FIG. 1 but out of use.

Referring now to FIGS. 1 to 4, shown therein is an electronic flash 10 of the present invention which is comparably cheap as and adapted to be attached to a lens-fitted photographic film unit 50 (which is hereinafter referred to as a film unit for simplicity) which is shown to the left of the electronic flash 10 and is sufficiently cheap even to be disposable. The electronic flash 10 comprises a housing 11, with its associated elements incorporated therein, and an external casing 12 in which the housing 11 of the electronic flash 10 is encased tightly. The external casing 12 is made of a printable cardboard or a printable thin plastic sheet or the like.

A blank 12A for making the external casing 12 has an unfolded shape shown in FIG. 2A. The blank 12A, to which printing and/or an ornamental surface pattern can be applied, is formed with perforated lines along which rectangular openings 13A, 14A, 15A and 16A can be made to expose elements of the electronic flash 10 such as a flash lamp assembly 13, a charge switch 14, a hot shoe connection 15 and a rare gas, e.g. xenon flash lamp 16, respectively.

After applying an ornamental surface pattern and the necessary printing, the blank 12A is folded to encase the housing 11 of the electronic flash 10 tightly therein as shown in FIG. 2B. Upon using the electronic flash 10, the parts surrounded or bordered by the perforated lines are torn off to expose the elements 12 to 16 of the electronic flash 10. Otherwise, the blank 12A may be formed with the necessary openings punched out prior to being folded to encase the housing 11 of the electronic flash 10.

The film unit 50 is encased tightly in an external casing 52 formed with openings through which are exposed a taking lens 54, a finder window 55, a shutter release button 56, a frame counter 57 and a film advancing knob 58 which are well known in the art of disposable lens-fitted photographic film units, and a hot shoe 59 which is well known in the camera art.

Figure 3:
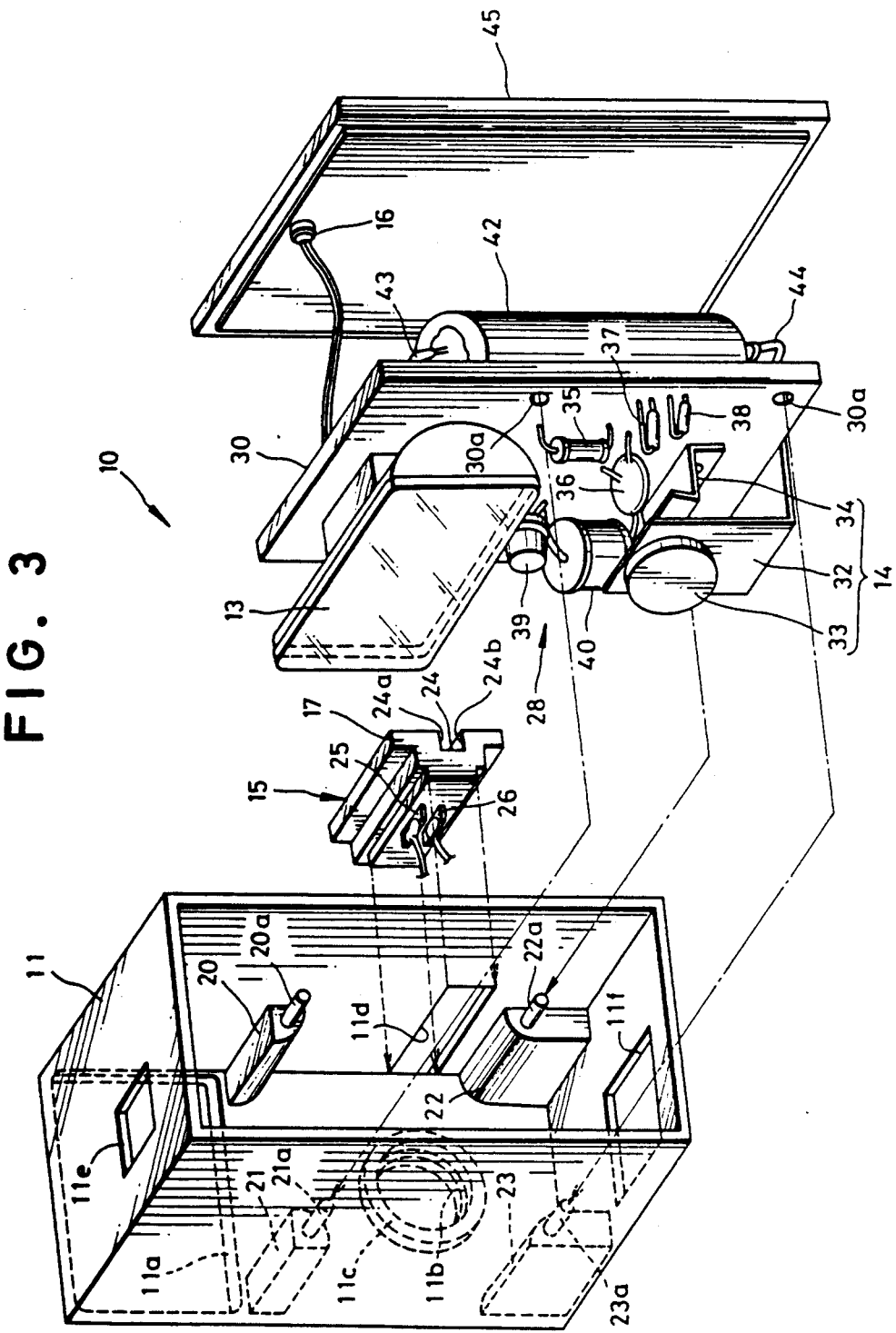
FIG. 3 is an exploded perspective view illustrating the electronic flash of FIG. 1.

Referring to FIG. 3 showing the electronic flash 10 with its front side facing to the left rear, before assembling, the electronic flash 10 comprises the housing 11, the hot shoe connection 15, a printed circuit base board 30 and a back cover 45. This housing 11 is preferably made of a plastic material and is formed at an upper portion of its front wall with an opening 11a in which the flash lamp assembly 13 is placed and a circular opening 11b with an annular rim 11c in which the charge switch 14 for actuating a charge and discharge control circuit 28 is placed. The opening 11b has a diameter smaller than that of the annular rim 11c.

The housing is further formed in a lower portion of a side wall with a generally rectangular opening 11d through which the hot shoe connection 15 projects and in its top and bottom walls with openings 11e and 11f through which a battery is removed or inserted. Inside the housing 11, there are upper supporting members 20 and 21 integrally formed with the housing 11 disposed just under the opening 11a and lower supporting members 22 and 23. On the end of each supporting member 20, 21, 22, 23 is formed a pin 20a, 21a, 22a, 23a.

The hot shoe connection 15 is provided with a pair of leaf contacts 25 and 26 made of conductive thin metal and a mounting member 17 separately mounting the leaf contacts 25 and 26 thereon which is made of a plastic material and molded in a generally T-shaped cross section. This mounting member 17 is formed with a central groove 24 extending in the direction of the depth of the housing 11, and the inside walls 24a and 24b of groove 24 are attached to the ends 25a and 26a of the leaf contacts 25 and 26. It is to be noted that these ends 25a and 26a of the leaf contacts 25 and 26 are so placed within the central groove 24 as not to project from the outer surface 17a of the mounting member 17 in order to be kept free from oil and foreign substances.

Figures 4, 5:
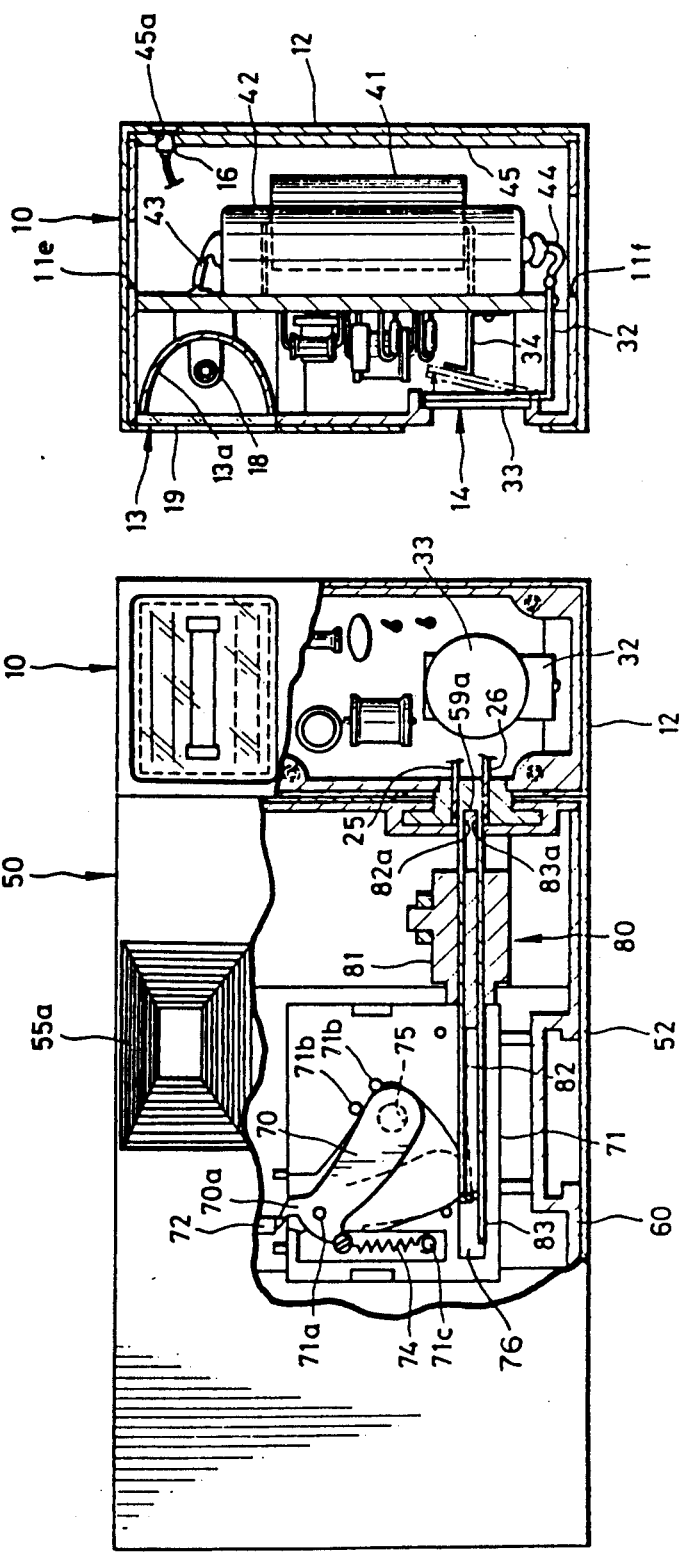
FIG. 4 is a cross sectional view showing the interior of the electronic flash of FIG. 1.
FIG. 5 is a front view, partially broken away, showing the lens photographic film unit shown in FIG. 1.

The printed circuit base plate 30 on which elements of the charge and discharge control circuit 28 are arranged is used as a supporting member for several parts. Specifically, the printed circuit base plate 30 is attached to the flash lamp assembly 13 at its upper section, the charge and discharge control circuit 28 at its middle section and the charge switch 14 at its lower section. The flash lamp assembly 13, as is shown in FIG. 4, has a reflector 13a which has an arcuate cross section and preferably a parabolic cross section, and has a plated metal mirror surface for reflecting light. In a chamber formed inside the reflector 13a, there is a discharge lamp 18 with a rare gas e.g. xenon sealed therein which is connected to the charge and discharge control circuit 28. For protecting the discharge lamp 18 and providing more uniform distribution of the light emitted from the discharge lamp 18, a transparent plastic cover plate 19 is disposed in front of the reflector 13a and fitted in the opening 11a of the front wall of the housing 11.

The charge switch 14 comprises a non-conductive disk member 33, an L-shaped conductive contact member 32 and a Z-shaped conductive contact member 34 arranged in this order from the outside of the housing 11. The L-shaped conductive contact member 32 is made of resilient sheet metal and is fastened with set-screws to the bottom of the printed circuit base plate 30. Attached adhesively to the L-shaped contact member 32 is the non-conductive disk member 33 made of a plastic material which serves as a charge button and prevents users from getting an electric shock. The Z-shaped contact member 34 is attached to the printed circuit base plate 30 so as to face at its free end and be normally spaced from the L-shaped contact member 34.

As is best seen in FIG. 3, the charge and discharge control circuit 28 includes a trigger coil 35, a trigger capacitor 36 resistances 37 and 38, an oscillating transistor 39 and an oscillating coil 40, these elements being all disposed between the flash lamp assembly 13 and the charge switch 14, and a main capacitor 41 (see FIG. 4) disposed on the back of the printed circuit base plate 30. Adjacent to the main capacitor 41, there is a battery 42 of the type, for example, unit three or unit four as a power source fixed to the back of the printed circuit base plate 30. This battery is electrically connected to the L-shaped contact member 32 and the main capacitor 41 through lead wires 44 and 43, respectively, at the opposite poles.

Figure 6:
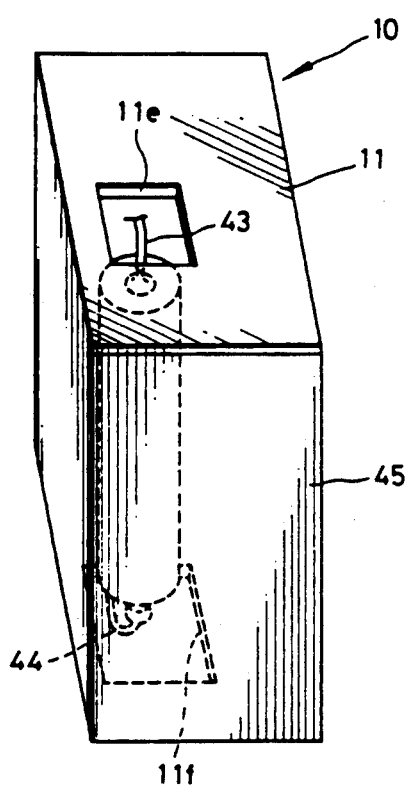
FIG. 6 is a perspective view of the electronic flash of FIG. 1 for the removal of the battery.

For allowing the electronic flash 10 to be disposable, the battery 42 can be easily removed from the housing 11 of the electric flash 10. For the removal of the battery 42, as is shown in FIG. 6, the top and bottom openings 11e and 11f are used. In these openings 11e and 11f, the lead wires 43 and 44 are led so as to allow them to be cut by the use of a nipper or the like for the purpose of easily removing the battery 42 from the housing 11 through the lower opening 11f.

As is seen in FIG. 4, at an upper section of the back cover 45, there is formed a small opening 45a with a neon lamp 16 disposed therein which emits light upon the main capacitor 41 being charged, in order to indicate that the electronic flash 10 is ready. This lamp 16 is connected to the printed circuit base plate 30 through a wire. The contact members 25 and 26 are connected to a triggering circuit which is well known in the art and therefore not shown.

When assembling the electronic flash 10, the printed circuit base plate 30 is firstly attached to the housing by inserting the pins 20a to 23a of the supporting members 20 to 23 into holes 30a formed in the printed circuit base plate 30. Thereafter, the end of each pin is thermally deformed and caulked, thereby to secure the printed circuit base plate 30 to the housing 11. Then the transparent plastic cover plate 19 of the flash lamp assembly 13 is fitted into the opening 11a of the housing 11 and the nonconductive disk member 33 is disposed within the annular rim 11c so as to extend across the opening 11b. Because the disk member 33 is disposed below the outer surface of the housing 11, it is prevented from being accidentally operated. Owing to this arrangement of the charge switch 14, although the battery 42 is previously incorporated in the housing of the electronic flash 10, the electronic flash 10 prevents the battery 42 from being discharged before use.

The hot shoe connection 15 is fitted in and secured with a suitable adhesive to the opening 11d. Then, the wires connected to the contact members 25 and 26 at their ends are welded and connected to the charge and discharge control circuit 28 on the printed circuit base plate 30. The neon lamp 16 connected to the printed circuit base plate 30 by a wire is fitted into the opening 45a formed in the back cover 45 and thereafter the back cover 45 is fitted into and secured with a suitable adhesive in the back opening of the housing 11 of the electronic flash 10. Finally, the housing 11 is wrapped in the cardboard external casing 12 to complete the electronic flash 10.

Referring to FIG. 5, showing the lens-fitted photographic film unit 50 with the electronic flash 10 attached thereto, a film unit housing 60 of the film unit 50 is provided with a shutter bearing plate 71 formed integrally therewith and disposed at the middle thereof. Above the shutter bearing plate 71, there is a shutter actuating lever 72 disposed in the film unit housing 60. A pivot pin 71a mounted on the shutter bearing plate 71 pivotally supports a shutter blade 70 which has a hook 70a in engagement with the shutter actuating lever 72 and is forced to turn in the counterclockwise direction by means of a spring 74 stretched between the shutter blade 70 and a pin 71c mounted on the shutter bearing plate 71.

At the center of the shutter bearing plate 71, there is an exposure aperture 75 defined by a circular opening formed in the shutter bearing plate 71 which is usually closed by the shutter blade 70. Below the exposure aperture 75, there is a transverse slit 76 formed in the shutter bearing plate 71 wherein contact members 82 and 83 of a synchronizing contact unit 80 are received. This synchronizing contact unit 80 comprises a pair of the contact members 82 and 83 in the form of a conductive leaf spring and a molded holding block 81 of a plastic material for electrically separately holding the contact members 82 and 83.

The contact member 82 at its inner end is bent down toward the contact member 83 so as to be brought into contact with the contact member 83 by the shutter blade 70 when the shutter blade 70 fully opens. Outer ends 82a and 83a of the contact members 82 and 83 project outside the film unit housing 60 so as to pinch a center projection 59a (see FIG. 1) of the hot shoe 59. These outer ends 82a and 83a of the connecting members 82 and 83 are brought into contact with the outer ends 25a and 26a of the contact members 25 and 26 of the electronic flash 10 when the electronic flash 10 is attached to the film unit 50. As is well known in the art, the film unit 50 has a back cover attached thereto by ultrasonic welding and a roll of film previously loaded therein so as to be ready for exposure at any time and so is adapted to be a single-use film unit.

In the use of the electronic flash 10 according to the present invention, the electronic flash 10 shown in FIG. 2B is readied for use by tearing off the openable parts 13A, 14A, 15A and 16A along the perforated lines to expose the flash lamp assembly 13, charge switch 14, hot shoe connection 15 and neon lamp 16. Thereafter, the electronic flash 10 is attached to the film unit 50 by slidably engaging or coupling the hot shoe connection 15 of the electronic flash 10 with or to the hot shoe 59 of the film unit 50 as is shown in FIG. 5. As a result, there is provided an electrical contact between the outer ends 25a and 26a of contact members 25 and 26 of the electronic flash 10 and the outer ends 82a and 83a of the contact members 82 and 83 of the synchronizing unit 80 incorporated in the film unit 50, respectively, thereby to complete the coupling of the film unit 50 and the electronic flash 10.

The disk member 33 of the charge switch 14 is pushed with a finger to bend the L-shaped contact member 32 as is shown by a dotted line in FIG. 4 so as to bring it into contact with the Z-shaped contact member 34 in order to cause an electric current to flow from the battery 42 to the main capacitor 41 of the charge and discharge control circuit 28. When the main capacitor 41 is thus charged, the neon lamp 16 is illuminated to indicate that the electronic flash 10 is ready for use. On the other hand, when the disk member 33 of the charge switch 14 is restored from the position shown by a broken line to its initial position in FIG. 4 by releasing the finger therefrom, the charging of the main capacitor 41 is terminated.

The shutter actuating lever 72, which is shown as having been cocked in FIG. 5, rapidly turns to force the hook 70a of the shutter blade 70 as a result of an operation of the shutter button 56. Consequently, the shutter blade 70 turns to a position shown by a phantom line in FIG. 5 to open fully the exposure aperture 75. At the end of turning of the shutter blade 70, the shutter blade 70 at its lower edge pushes the contact member 82 to bend it, thereby bringing the inner end of the contact member 82 into contact with the contact member 83.

As is well known in the art, at the moment of the contact between the contact members 82 and 83, a trigger signal is applied to the triggering circuit in the charge and discharge control circuit 28 through the contact members 25, 26, 82 and 83 so as to discharge the high-voltage charge in the main capacitor 41 through the discharge lamp 18. As a result, a bright flash is emitted from the discharge lamp 18 to illuminate the object photographed. Immediately after the discharge of the main capacitor 41, the hook 70a of the shutter blade 70 disengages from the shutter actuating lever 72, and the shutter blade 70 is forced to return to its initial position shown by a solid line in FIG. 5 by means of the spring 74. When the shutter blade 70 abuts against a stopper pin 71b mounted on the shutter bearing plate 71, the shutter stops in such a position as to close the exposure opening 75.

When the main capacitor 41 is discharged, the neon lamp 16 turns off, and this indicates that the charge switch 14 has to be operated to make the electronic flash 10 usable for the next exposure. Since the main capacitor 41 of the electronic flash 10 is charged upon the disk member 33 of the charge switch 14 being pushed, the camera or film unit with the electronic flash 10 is conveniently used in such a way as to operate the shutter release button 56 to make an exposure while the disk member 33 of the charge switch 14 is being pushed by a finger or the hand by which the electronic flash 10 attached to the camera 50 is held. In such a use, the user will be prevented from partially covering the transparent cover plate 19 of the electronic flash assembly 13 with a finger or fingers and thus intercepting the light from the electronic flash 10.

After a number of exposures using the electronic flash 10, the battery 42 previously incorporated in the electronic flash 10 will be gradually discharged and will become unusable. As a result, the charging time required to charge the main capacitor 41 becomes longer, which is indicated by a longer time before the neon lamp 16 turns on.

The film unit 50, after all the frames of the film in the film unit 50 have been exposed, is forwarded to a photo shop or photo laboratory either with or without the electronic flash 10, to develop the film and to make prints. There, the electronic flash 10 is removed from the film unit 50 and, after removing the battery 42, is scrapped. After removing the external casing 52, the film unit housing 60 is broken to remove the film for development and printing and the casing 52 and housing 60 are also scrapped.

Referring to FIG. 7, shown therein is the electronic flash according to another preferred embodiment of the present invention for use with a lens-fitted photographic film unit shown on the left thereof. In this figure, both the electronic flash and the lens-fitted photographic film unit are shown out of their external casings. As shown, the electronic flash 90 has a plastic housing 91 with a hot shoe connection 92 formed integrally with a side wall 92a thereof. This hot shoe connection 92 forms three projections 93, 94 and 95 and a plate-like projection 96. These projections 94 and 95 are disposed face to face and provided with contact members 97 and 98, respectively, for receiving a synchronizing signal from a film unit 100. The projections 94 and 95 form therebetween a space having a distance too narrow for fingers to enter in order to keep the contact members 97 and 98 free from oil and foreign articles. This is important because clean contact members can reliably receive an electric signal.

At the upper left of the side wall 91a of the housing 91, there is formed an opening 99. Designated at 91b is a flexible member formed integrally with the housing 91 by forming slits on three sides thereof. Behind the flexible member 91b, there is a switch assembly similar to that comprising the L-shaped and Z-shaped contact members 32 and 34 of the electronic flash 10 shown in FIG. 4. When depressing the flexible member 91b to bend it, the charge switch is turned on.

On the other hand, a lens-fitted photographic film unit (which is referred to as a film unit for simplicity) 100 has a plastic housing 101 with a hot shoe 102 integrally formed with a side wall 101a thereof. This hot shoe 102 comprises a recess 104 and a projection 105 having a tapered end formed integrally with the bottom of the recess 104 and is attached to the hot shoe connection 92 of the electronic flash 90. On upper and lower sides of the projection 105, there are formed grooves in which are disposed contact members 107 and 108 comprised by a leaf spring member. At the upper right corner of the side wall 101a, there is provided a lock member 110. On both sides of the lock member 110, there are incision lines 111 formed in the side wall 101a of the film housing 101 so as to allow the lock member 110 to be resiliently bendable in order to be depressed inside the film unit housing 101 when the electronic flash 90 is slidably attached to the film unit 100 through the insertion of the hot shoe connection 92 of the electronic flash 90 into the recess 102 of the film unit 100. Owing to the provision of the bendable lock member 110, the electronic flash 90 is attached to the film unit 100 and prevents it from being detached therefrom.

To attach the electronic flash 90 to the film unit 100, the rear end of the electronic flash 90 is pressed against the front end of the film unit side to side, and then the plate-like projection 96 of the hot shoe connection 92 is slidably inserted into the recess 104 and pushed in the rearward direction until the rear end of the plate-like projection 96 abuts against the end of the recess 104. As a result, the lock member 110 of the film unit 100 engages with the opening 99 of the electronic flash 90 thereby to couple the electronic flash 90 to the film unit 100.

Figure 8:
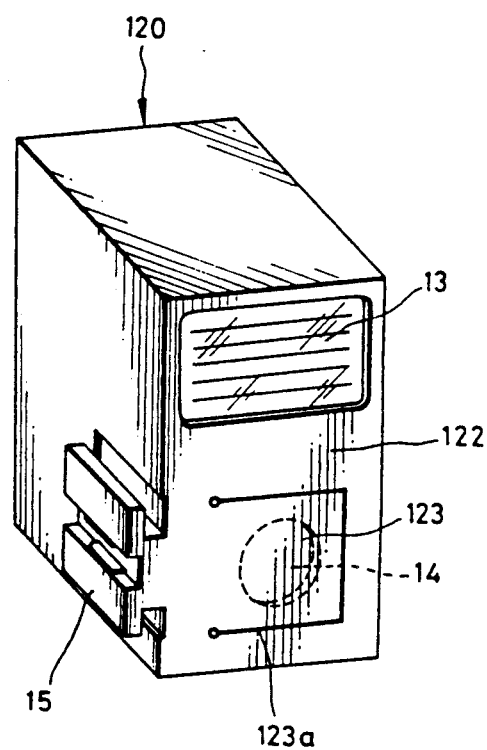
FIG. 8 is a perspective view of an electronic flash according to still another preferred embodiment of the present invention.

Referring to FIG. 8, shown therein is the electronic flash of still another preferred embodiment of the present invention in which only the external casing is different from the external casing 12 of the electronic flash 10 of FIG. 1. As shown, the electronic flash 120 of which necessary elements are incorporated in a housing is encased tightly in an external casing 122 made of a printable cardboard or a printable thin plastic sheet or the like. The blank for making the external casing 122 has the same unfolded shape as the blank 12A shown in FIG. 2A. The blank is formed with perforated lines for defining square parts which are torn off to form openings for the flash lamp assembly 13, the hot shoe connection 15 and the neon lamp 16 (which is not visible in FIG. 8). Part 123 of the external casing 122 overlying the charge switch 14 is surrounded by a incised line 123a on three sides. Owing to the provision of the incised lines 123a, the part 123 is made flexible, allowing the user to push the charge switch from the outside of the external casing 122 without tearing off the part 123. The electronic flash 120 is attached in the same way as described for FIG. 1 when it is used.

Figure 9:
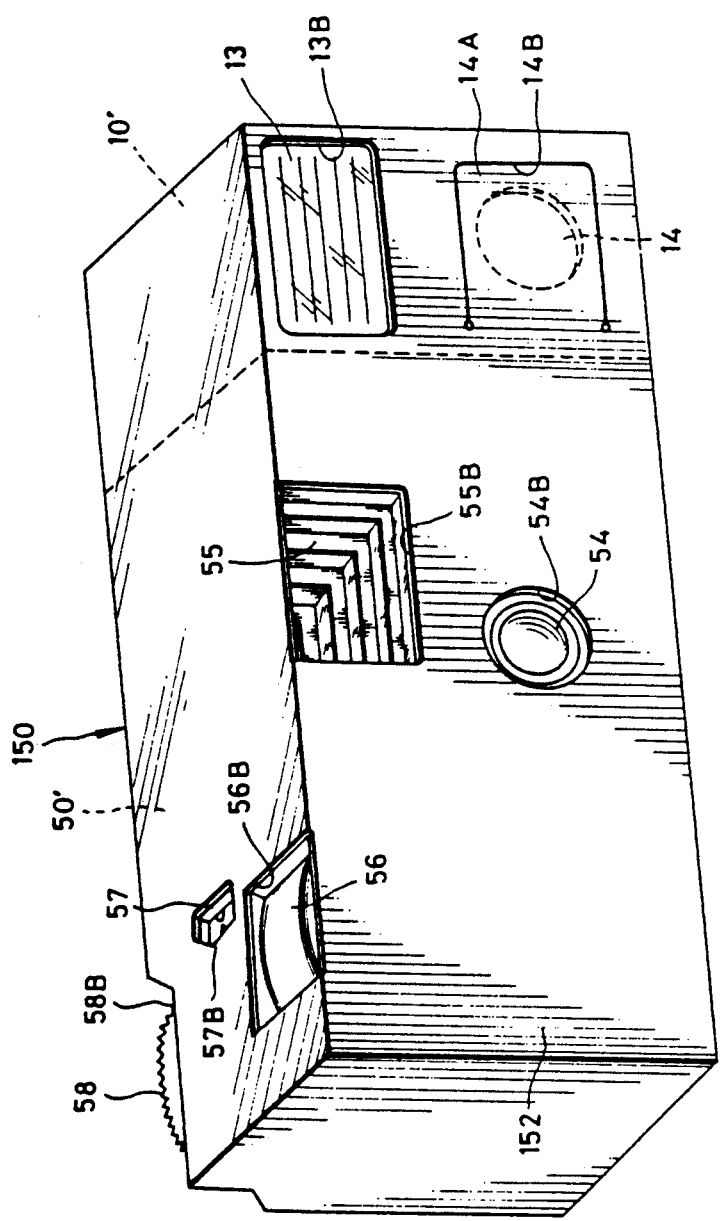
FIG. 9 is a perspective view showing an electronic flash fitted photographic film unit according to a further preferred embodiment of the present invention.

Referring finally to FIG. 9, shown therein is a disposable flash-fitted photographic film unit 150. As shown, the disposable flash-fitted photographic film unit 150 comprises a film unit 50' and an electronic flash 10' connected to each other in encased fashion in an external casing 152 common to both. For connecting the film unit 50' and the electronic flash 10;, the hot shoe 59 and the hot shoe connection 15 may be detachably coupled. Otherwise, the hot shoe 59 and hot shoe connection 15 may be removed so as permanently to secure the film unit and electronic flash side by side with a suitable adhesive. This combined film unit 50' and electronic flash 10' may be provided by replacing the external casings 52 and 12 of the film unit 50 and the electronic flash 10 of FIG. 1 with casing 152 common to both. As all components of the film unit 50' and the electronic flash 10, no description thereof will be needed. The external casing 152 is made of either a printable cardboard or a thin printable plastic sheet from a single blank which is formed with several openings 13B, 54B, 55B, 56B, 57B and 58B punched out for exposing the flash lamp assembly 13, the taking lens 54, the finder window 55, the shutter button 56, the frame counter 57 and the film advancing knob 58; and flexible part 14A is defined at three sides by an incised line 14B for allowing the charge switch to be depressed from outside the external casing 152.

As will be apparent from the above-described embodiments, the provision of the external casing which encloses the electronic flash housing not only when out of use but also when in use, allows the electronic housing to have a roughly finished external appearance, resulting in a cheap electronic flash, even a disposable electronic flash as well as a single-use film unit. In addition, because the electronic flash is entirely enclosed in the external casing before use, elements such as the electric contact members and the transparent plastic plate of the flash lamp assembly can be prevented from being dirtied and/or scratched so as to ensure sufficient electric contact between the electric contact members of the hot shoe of the film unit and the hot shoe connection of the electronic flash.

Furthermore, because the electric contact members of the hot shoe connection of the electronic flash are disposed within the recess formed in the connecting member, they are prevented from being soiled by the fingers or the like. This ensures the unit will flash. Furthermore, the charge switch is prevented from being inadvertently pushed, thereby to prevent the battery from losing its power.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. An electronic flash comprising:
    a housing incorporating therein a flash lamp assembly and a charge circuit including a capacitor, said housing having a recess therein;
    an externally operable charge switch disposed within said housing for causing said charge circuit to charge said capacitor when said charge switch is depressed, said charge switch having a manually operable actuating member that is disposed in said recess and is entirely recessed below the outer surface of said housing; and
    a hot shoe connection connectable to a hot shoe of a photographic device.

2. An electronic flash as defined in claim 1, wherein said charge switch is a normally open switch.

3. An electronic flash as defined in claim 1, wherein said photographic device is a disposable lens-fitted photographic film unit.

4. A disposable electronic flash comprising:
    a housing incorporating therein a flash lamp assembly and a battery, said housing having a transparent window through which a light flash is projected and an opening through which said battery can be removed; and
    an external casing enclosing tightly said housing and which casing closes said opening through which said battery can be removed and has an opening for exposing said transparent window.

5. An electronic flash as defined in claim 4, further comprising a hot shoe connection connectable to a hot shoe of a photographic device, said casing exposing said hot shoe connection.

6. An electronic flash as defined in claim 4, wherein said external casing is made of a printable cardboard.

7. An electronic flash as defined in claim 4, wherein said external casing is made of a printable thin plastic sheet.

8. An electronic flash as defined in claim 4, further comprising a hot shoe connection connectable to a hot shoe of a photographic device, said casing having openable parts adapted to be torn off to form said opening and to expose said hot shoe connection, respectively.

9. An electronic flash as defined in claim 8, wherein said openable parts are defined by and torn off along perforated lines.

10. A disposable lens-fitted photographic film unit with an electronic flash comprising:
    a disposable lens-fitted film unit comprising a film casing, an unexposed film contained in said film casing, a taking lens attached to said film casing, exposure means incorporated in said film casing and an electronic contact, all integrated as a unit;
    an electronic flash comprising a housing incorporating a flash lamp assembly including a capacitor, said housing having a recess therein and a transparent window through which a light flash is projected and electronic contacts connected to said disposable lens-fitted photographic film unit;
    a push-type charge switch disposed below said transparent window for charging said capacitor of said flash lamp assembly, said charge switch having a manually operable actuating member disposed in said recess in substantially the same plane as said transparent window; and
    an external casing encasing said disposable lens-fitted photographic film unit and said electronic flash connected to each other through said electronic contacts, said external casing having openings for exposing at least said taking lens and said transparent window.

11. A disposable lens-fitted photographic film unit with an electronic flash as defined in claim 10, wherein said external casing is formed with an opening for exposing said charge switch.

12. A disposable lens-fitted photographic film casing with an electronic film unit as defined in claim 10, wherein said external casing is made of a printable cardboard.

13. A disposable lens-fitted photographic film unit with an electronic flash as defined in claim 10, wherein said external casing is made of a think plastic sheet.

14. A disposable lens-fitted photographic film unit with an electronic flash, comprising:
- a disposable lens-fitted film unit comprising a film casing, an unexposed film contained in said film casing, a taking lens attached to said film casing, exposure means incorporated in said film casing and a hot shoe, all integrated as a unit;
- an electronic flash comprising a housing incorporating a flash lamp assembly including a capacitor, said housing having a transparent window in a front wall of said housing through which a light flash is projected and a hot shoe connection slidably engaged with said hot shoe of the disposable lens-fitted photographic film unit, said front wall having a recess therein, said unit and said flash being disposed side by side in a horizontal direction, and a push-type charge switch disposed in said recess in said front wall below said transparent window for charging said capacitor, said switch being entirely recessed below the outer surface of said front wall and being operable from outside said housing.

15. A disposable lens-fitted photographic film unit with an electronic flash as defined in claim 14, wherein said front wall has a uniplanar front surface.

16. A disposable lens-fitted photographic film unit with an electronic flash as defined in claim 14, further comprising a base board disposed within said housing, said base board being attached to said flash lamp assembly and said push-type charge switch on the front side thereof and to said capacitor and a battery for charging said capacitor on the back side thereof.

17. A disposable lens-fitted photographic film unit with an electronic flash as defined in claim 14, further comprising an external casing enclosing said housing, said casing having openings for exposing at least said transparent window and said hot shoe connection, respectively.

18. A disposable lens-fitted photographic film unit with an electronic flash as defined in claim 14, wherein said external casing has a flexible part that allows said charge switch to be pushed from outside said external casing.

19. A disposable lens-fitted photographic film unit with an electronic flash as defined in claim 14, wherein said flexible part is defined by an incised line.

20. A disposable lens-fitted photographic film unit with an electronic flash as defined in claim 14, wherein said external casing is made of a printable cardboard.

21. A disposable lens-fitted photographic film unit with an electronic flash as defined in claim 14, wherein said external casing is made of a printable thin plastic sheet.

22. A disposable lens-fitted photographic film unit with an electronic flash comprising:
- a disposable lens-fitted film unit comprising a film casing, an unexposed film contained in said film casing, a taking lens attached to said film casing, exposure means incorporated in said film casing and an electronic contact, all integrated as a unit;
- an electronic flash comprising a housing incorporating a flash lamp assembly including a capacitor, said housing having a transparent window through which a light flash is projected and electronic contacts connected to said disposable lens-fitted photographic film unit;
- a push-type charge switch disposed below said transparent window for charging said capacitor of said flash lamp assembly, said charge switch having a manually operable actuating member disposed in substantially the same plane as said transparent window; and
- an external casing encasing said disposable lens-fitted photographic film unit and said electronic flash connected to each other through said electronic contacts, said external casing having openings for exposing at least said taking lens and said transparent window; wherein said external casing has flexible parts to allow said charge switch to be depressed from outside said external casing.

23. A disposable lens-fitted photographic film unit with an electronic flash as defined in claim 22, wherein said flexible part is defined by an incised line.

24. A disposable lens-fitted photographic film unit with an electronic flash, comprising:
- a disposable lens-fitted film unit comprising a film casing, an unexposed film contained in said film casing, a taking lens attached to said film casing, exposure means incorporated in said film casing and a hot shoe, all integrated as a unit;
- an electronic flash comprising a housing incorporating a flash lamp assembly including a capacitor, said housing having a transparent window in a front wall of said housing through which a light flash is projected and a hot shoe connection slidably engaged with said hot shoe of the disposable lens-fitted photographic film unit, said unit and said flash being disposed side by side in a horizontal direction, and a push-type charge switch disposed in said front wall below said transparent window for charging said capacitor, said switch being operable from outside said housing; and
- an external casing enclosing said housing, said casing having openable parts adapted to be torn off to form openings for exposing at least said transparent window and said hot shoe connection, respectively, wherein said openable parts are defined by and torn off along perforated lines.

* * * * *